US011334882B1

(12) United States Patent
Jameson et al.

(10) Patent No.: US 11,334,882 B1
(45) Date of Patent: May 17, 2022

(54) DATA ACCESS MANAGEMENT ON A DISTRIBUTED LEDGER SYSTEM (71) Applicant: United Services Automobile Association (USAA), San Antonio, TX (US)

(72) Inventors: Hudson R. Jameson, Aubrey, TX (US); Seth Ethington, McKinney, TX (US); John C. Hopkins, III, San Antonio, TX (US); Benjamin D. Ethington, Savannah, TX (US); Jonathan F. Cholak, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 395 days.

(21) Appl. No.: 15/451,681

(22) Filed: Mar. 7, 2017

Related U.S. Application Data

(60) Provisional application No. 62/314,063, filed on Mar. 28, 2016.

(51) Int. Cl.
*G06Q 20/38* (2012.01)
*H04L 9/06* (2006.01)
(Continued)

(52) U.S. Cl.
CPC ... *G06Q 20/3829* (2013.01); *G06Q 20/40145* (2013.01); *H04L 9/0637* (2013.01); *H04L 9/3231* (2013.01); *G06Q 2220/10* (2013.01)

(58) Field of Classification Search
CPC .............................................. G06Q 20/00–425
See application file for complete search history.

(56) References Cited

U.S. PATENT DOCUMENTS

| 5,390,297 A | * | 2/1995 | Barber ................. G06F 21/105 |
| | | | 705/59 |
| 5,629,980 A | * | 5/1997 | Stefik ...................... G06F 21/10 |
| | | | 705/54 |

(Continued)

FOREIGN PATENT DOCUMENTS

| AU | 2016101183 A4 | 9/2016 |
| CN | 105488722 A | 4/2016 |

(Continued)

*Primary Examiner* — John W Hayes
*Assistant Examiner* — Taylor S Rak
(74) *Attorney, Agent, or Firm* — Fletcher Yoder, P.C.

(57) ABSTRACT

Techniques are described for managing ownership and transfers of physical objects using information stored on a distributed ledger such as a blockchain. A distributed ledger may securely store object data describing the current owner(s) of an object, the previous owner(s) of the object, the history of transfers of the object, and/or other information regarding the object. Use of a distributed ledger may provide an immutable, readily auditable record of the current ownership and ownership history of the object. Each user participating in the system may be assigned a unique identifier to be used for conducting transactions on the distributed ledger network. A user may also be provided with a digital security token such as a cryptographic key that is useable to authenticate the user and enable access to the object data stored on the distributed ledger(s).

15 Claims, 5 Drawing Sheets

(51) Int. Cl.
*H04L 9/32* (2006.01)
*G06Q 20/40* (2012.01)

(56) References Cited

U.S. PATENT DOCUMENTS

| | | | | |
|---|---|---|---|---|
| 5,909,553 | A * | 6/1999 | Campbell | G06F 13/426 709/236 |
| 6,954,738 | B2 * | 10/2005 | Wang | G06F 21/10 380/200 |
| 8,646,060 | B1 * | 2/2014 | Ben Ayed | H04L 63/205 726/9 |
| 2015/0332395 | A1 | 11/2015 | Walker et al. | |
| 2015/0379510 | A1 | 12/2015 | Smith | |
| 2016/0203477 | A1 | 7/2016 | Yang et al. | |
| 2016/0203572 | A1 * | 7/2016 | Mcconaghy | G06Q 20/10 705/58 |
| 2016/0300234 | A1 * | 10/2016 | Moss-Pultz | G06F 21/10 |
| 2016/0350728 | A1 * | 12/2016 | Melika | G06Q 20/3829 |
| 2017/0011460 | A1 | 1/2017 | Molinari et al. | |
| 2017/0046664 | A1 | 2/2017 | Haldenby et al. | |
| 2017/0053249 | A1 | 2/2017 | Tunnell et al. | |
| 2017/0103391 | A1 | 4/2017 | Wilson, Jr. et al. | |
| 2017/0109748 | A1 | 4/2017 | Kote | |
| 2017/0116693 | A1 | 4/2017 | Rae et al. | |
| 2017/0140375 | A1 | 5/2017 | Kunstel | |
| 2017/0154331 | A1 | 6/2017 | Voorhees | |
| 2017/0193619 | A1 | 7/2017 | Rollins et al. | |
| 2017/0206532 | A1 | 7/2017 | Choi | |
| 2017/0214699 | A1 | 7/2017 | Johnsrud | |
| 2017/0228704 | A1 | 8/2017 | Zhou et al. | |
| 2017/0230375 | A1 | 8/2017 | Kurian | |
| 2017/0237554 | A1 | 8/2017 | Jacobs et al. | |
| 2017/0287068 | A1 | 10/2017 | Nugent | |
| 2018/0075028 | A1 * | 3/2018 | Ruschin | G06Q 10/00 |
| 2018/0225469 | A1 * | 8/2018 | Daniel | G06F 21/10 |
| 2019/0043048 | A1 * | 2/2019 | Wright | G06Q 20/10 |
| 2019/0068365 | A1 * | 2/2019 | Wright | H04L 9/0838 |
| 2019/0303887 | A1 * | 10/2019 | Wright | H04L 9/3234 |

FOREIGN PATENT DOCUMENTS

| | | |
|---|---|---|
| CN | 105681301 A | 6/2016 |
| CN | 105956923 A | 9/2016 |
| CN | 105976231 A | 9/2016 |
| CN | 106228446 A | 12/2016 |
| CN | 106408299 A | 2/2017 |
| CN | 106530088 A | 3/2017 |
| CN | 106600403 A | 4/2017 |
| WO | 2016201429 A1 | 12/2016 |
| WO | 2017027648 A1 | 2/2017 |
| WO | 2017091530 A1 | 6/2017 |
| WO | 2017109140 A1 | 6/2017 |
| WO | 2017136643 A1 | 8/2017 |
| WO | 2017136956 A1 | 8/2017 |
| WO | 2017139688 A1 | 8/2017 |
| WO | 2017143435 A1 | 8/2017 |

* cited by examiner

//DATA ACCESS MANAGEMENT ON A DISTRIBUTED LEDGER SYSTEM

CROSS REFERENCE TO RELATED APPLICATION

This disclosure is related to, and claims priority to, U.S. Provisional Patent Application Ser. No. 62/314,063, titled "Managing Assets Using a Distributed Ledger System," which was filed on Mar. 28, 2016, the entirety of which is hereby incorporated by reference into the present disclosure.

BACKGROUND

In traditional systems that manage the transfers of an asset, a third party is involved to verify the authenticity of the title or other document showing ownership of the asset, and thus verify that the purported owner is actually the owner of the asset. Given the high degree of reliance on the third party authentication entity in traditional asset transfers, the use of the third party may lead to fraud or error if the third party is untrustworthy or incompetent. Moreover, the use of a third party authentication entity adds complexity to what would otherwise be a simple transaction between a buyer and a seller.

SUMMARY

Implementations of the present disclosure are generally directed to managing access to data regarding objects. More specifically, implementations are directed to managing access to object ownership information, and/or managing transfers of physical objects, using a distributed ledger system.

In general, innovative aspects of the subject matter described in this specification can be embodied in methods that includes actions of: receiving a digital security token associated with a first user; in response to a successful authentication of the first user based at least partly on the digital security token, accessing object data stored on a distributed ledger, the object data indicating that the first user is associated with a physical object; receiving a request for a second user to access the object data stored on the distributed ledger, the request associated with a transfer of the physical object from the first user to the second user; receiving a confirmation, from the first user, that the second user is allowed to access the object data; and based on permission received from the first user and the second user, updating the object data stored on the distributed ledger to identify the second user as associated with the physical object.

Implementations can optionally include one or more of the following features: the object data includes a digital version of a document describing ownership of the physical object; updating the object data includes modifying the digital version of the document to indicate the second user as a current owner of the physical object; the digital security token includes a private cryptographic key associated with the first user; the actions further include updating the object data to identify the first user as previously associated with the physical object; the actions further include disabling the digital security token to prevent the first user from subsequently accessing the object data stored on the distributed ledger; the actions further include generating a new digital security token to enable the second user to access the object data stored on the distributed ledger; the authentication of the first user is further based on biometric data for the first user; the biometric data is generated by at least one biometric sensor in proximity to the first user; the object data describes the at least one third user as an interested party associated with the physical object; updating the object data is further based on permission received from the at least one third user; and/or the distributed ledger is a blockchain.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Because implementations employ distributed ledgers (e.g., blockchains) to store and publish information (e.g., a deed or title) regarding an object, the object data is immutable and less prone to fraud, destruction, or corruption compared to object data stored on traditional storage systems. Accordingly, implementations avoid the expenditure of processing, memory, storage, networking, and/or other computational resources that may be used when traditional systems attempt to restore object data that has been lost or corrupted. Similarly, by providing a more secure and reliable mechanism for managing the transfer (e.g., sale) of an object, implementations avoid the expenditure of computing resources that may be used when traditional systems are required to back out or otherwise reverse fraudulent or erroneously performed object transfers. Moreover, through the utilization of smart contracts and/or side chains, implementations significantly increase the speed at which object transfer transactions occur, compared to traditional systems. Implementations also increase the speed of transfer processing by related components and/or systems, such as title search systems, legal support systems, systems of government agencies (e.g., building agencies, title registrars, etc.), mortgage lender systems, and so forth. Moreover, by managing objects through distributed ledger system(s), implementations provide superior electronic provenance compared to human operated systems.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for managing objects, and managing object transfers, using information stored on a distributed ledger (e.g., a blockchain). Implementations employ a distributed ledger, such as a blockchain, to securely store object data describing the current owner(s) of an object, the previous owner(s) of the object, the history of transfers of the object, and/or other information regarding the object. Use of a distributed ledger may provide an immutable, readily auditable record of the current ownership and ownership history of the object. In some implementations, the object is a physical (e.g., tangible) object such as a parcel of real property and/or structures on the property. The object may also be another type of physical object such as a vehicle (e.g., automobile, boat, plane, etc.).

Implementations provide a system for transferring objects, or otherwise managing objects, using the object data stored on distributed ledger(s). Each user participating in the system may be assigned a unique identifier (ID) to be used for conducting transactions on the blockchain network. In some implementations, a user may be provided with a digital security token that is useable to authenticate the user and enable access to the object data stored on the distributed ledger(s). For example, a user may be issued a private key which is associated with a public key, and the pair of keys may be employed to access the object data on the distributed ledger(s). The user can claim ownership of an object, such as a house or a car, and the ownership information for an object may be digitally represented as an image of a physical (e.g., printed) title, a digital digest of a title, and/or any other suitable information that digitally represents the object. The object data describing ownership may be published to and/or stored on the distributed ledger. In some instances, a particular distributed ledger (e.g., blockchain) may be associated with a particular object, and may store object data regarding that object.

User(s) may access the object data on the distributed ledger to verify the ownership of the object. In some instances, the distributed ledger may be accessed to manage the transfer of an object from one entity to another. A transaction describing the ownership of an object may be added to the (e.g., append-only) structure of the distributed ledger. If a user wants to transfer ownership of the object to another user, e.g., as part of a sale of the object, the current owner may publish a transaction that transfers the digital representation (e.g., title or deed) of the physical object to the new owner. The new owner would then own the object, and the ownership may be verified by showing the transaction that transfers the digital representation of the physical object to the new owner was published to the distributed ledger. In some instances, the distributed ledger system may use a custom, distributed public key infrastructure (PKI) to maintain participant addresses.

Because the distributed ledger system may use a consensus algorithm to verify the validity of ownership transactions, implementations may obviate the need for a third party arbiter to validate ownership and transfer of a physical object. In traditional scenarios for object transfer, a third party arbiter would normally charge a fee to act as a trusted entity that can prove ownership in court. For example, a government agency may charge a fee in exchange for acting as a trusted arbiter for property or vehicles deeds or titles. Through use of the implementations described herein to manage the transfer of an object, auditing may be facilitated without the use of third party arbiters, thus avoiding payment of the traditional fee. Current and past ownership of an object may be provable to curious parties through the cryptographic algorithms that secure the distributed ledger(s) on which the object data is published.

Figure 1:
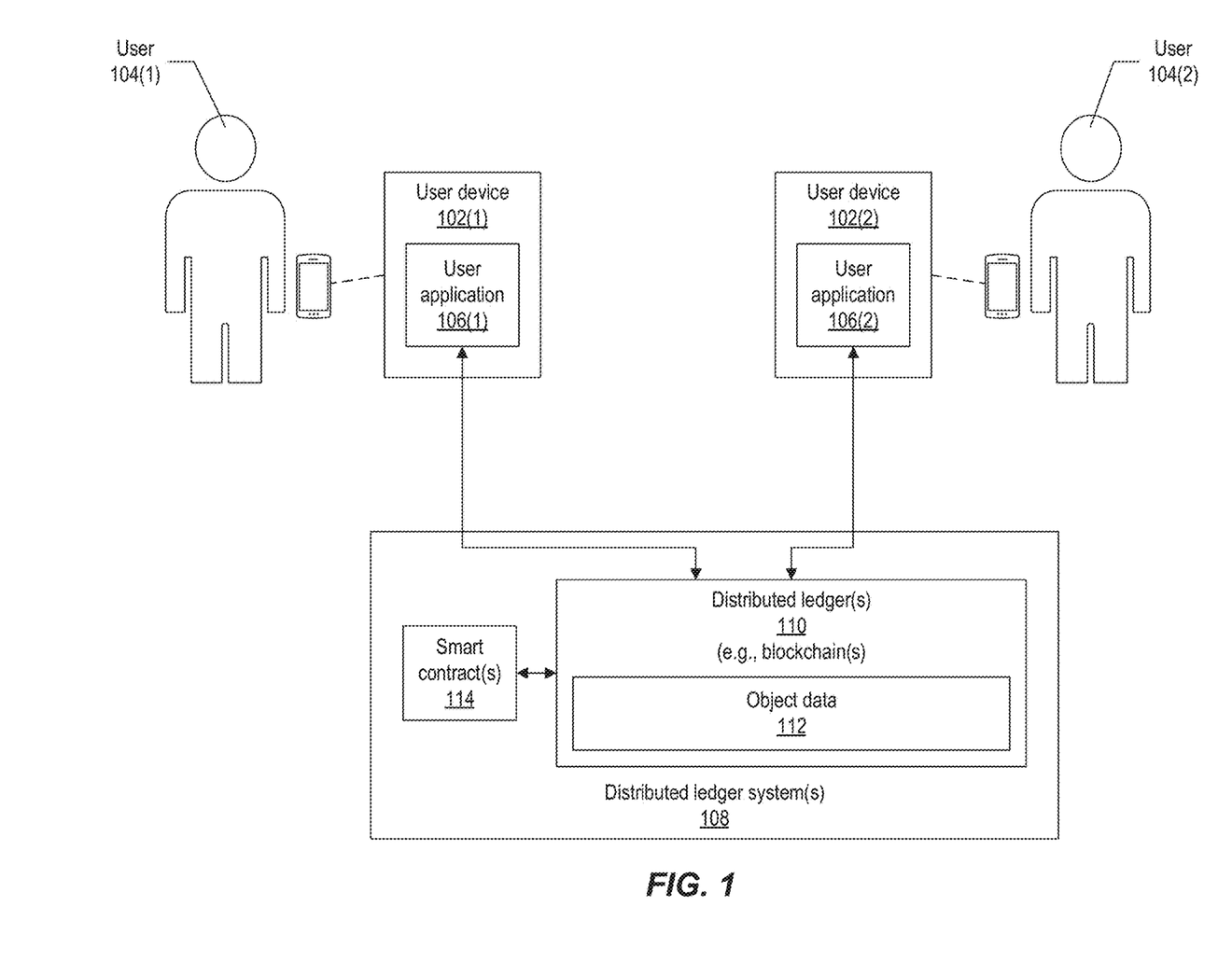
FIG. 1 depicts an example system for managing objects using a distributed ledger, according to implementations of the present disclosure.

FIG. 1 depicts an example system for managing objects using a distributed ledger, according to implementations of the present disclosure. As shown in the example of FIG. 1, the system may include one or more user devices 102 that are each owned by, operated by, or otherwise associated with a user 104. The user device(s) 102 may include any appropriate type of computing device, such as portable device(s) (e.g., smartphones, tablet computers, wearable computers, etc.) and less mobile device(s) (e.g., desktop computers). A user device may execute a user application 106 that enables the user 104 to access and/or modify object data 112 that stored on one or more distributed ledgers 110. The distributed ledger(s) 110 may be implemented on one or more distributed ledger systems 108. The distributed ledger system(s) 108 may include any appropriate type and number of computing device(s), such as server computer(s) and/or distributed computing device(s) (e.g., cloud server(s)). The distributed ledger system(s) 108 may communicate with the user device(s) 102 and/or other computing device(s) over one or more networks.

In some implementations, the distributed ledger system(s) 108 may execute one or more smart contracts 114. The smart contract(s) 114 may include executable logic that updates the object data 112 stored on the distributed ledger(s) 110. Updates may be made by writing transaction(s) to the append-only structure of the distributed ledger(s) 110. In some implementations, the smart contract(s) 114 may apply logic, e.g., according to one or more rules, to update the object data 112. For example, the smart contract(s) 114 may apply logic to manage the transfer of an object from a first user 104(1) to a second user 104(2), by publishing a transaction that indicates the transfer of ownership on the distributed ledger(s) 110.

The user 104 may be a single user, a group of users, or some other entity such as a corporation. In some instances, the user 104 may be a Decentralized Autonomous Organizations (DAO) including one or more autonomous artificial intelligence (AI) agents that perform operations and make decisions regarding the management of the object.

The object data 112 may be published on a distributed ledger 110 that is particularly associated with the object. For example, each object may be associated with its own distributed ledger 110 that includes published object data 112 related to the corresponding physical object. A physical object, such as a house, vehicle, and so forth, may be deeded and/or titled to a user 104. The object may be a unique tangible object that exists in the physical world, and the object data 112 may digitally represent that object in the distributed ledger system(s) 108.

By storing and publishing the object data 112 on a distributed ledger 110 (e.g., blockchain) that is secure and append-only, such that information may be added to but not deleted from the distributed ledger 110, implementations may ensure that ownership information is not corrupted or fraudulent. Moreover, by storing the object data on a distributed ledger 110 that is distributed across multiple distributed ledger system(s) 108, implementations may reduce or eliminate the chance that the object data 112 may be irrecoverably lost or destroyed, either intentionally or unintentionally during a natural disaster, fire, war, or other catastrophic event. Accordingly, the incorruptible, secure, and distributed publication of the object data 112 may be useful in regions where the traditionally stored title or deed information is prone to being disrupted, lost, or corrupted due to war, refugee crises, natural disasters, or other catastrophes. For example, in instances where house titles or deeds are stored using traditional methods (e.g., paper files), a family who is uprooted from their home due to war or natural disaster may return home to find others have taken possession of their property, and the legitimate owners may have no recourse if paper records (or traditionally stored digital records) have been lost or corrupted. Implementations may provide more reliable ownership records for objects in such situations. The distributed ledger(s) 110 may provide security, traceability, and/or metadata to be used to settle challenges to ownership of an object.

In some implementations, the object data 112 on the distributed ledger(s) 110 may be secured and accessible only to users 104 with the appropriate digital security tokens. The use of a distributed ledger 110 (e.g., a blockchain) to store the object data 112 may provide further security due to the characteristics of the distributed ledger 110. For example, the distributed ledger 110 may provide (e.g., built-in) security to ensure access is only granted to those users 104 with approved addresses and/or digital security tokens. The object data 112 may be stored in a (e.g., unique) record on the distributed ledger 110, and such a record may be verifiable by multiple sources. The distributed nature of the distributed ledger(s) 110 may prevent the object data 112 from being inadvertently or deliberately destroyed.

When a user 104(1) seeks to sell or otherwise transfer a physical object to another user 104(2), The user 104(1) may access the distributed ledger 110 for the object to retrieve evidence that the user 104(1) is the current owner of the property. Such evidence may be in the form of a digital title, an image of a physical title, and/or a digital digest of a title. The user 104(1) may also retrieve, from the distributed ledger(s) 110, evidence regarding previous owners and the chain of ownership from owner to owner. Accordingly, the object data 112 published by the distributed ledger 110 may provide confirmation that the chain of title is sound, without gaps or inconsistencies, such that the owner has a proper claim to current ownership of the object.

In some implementations, the current owner (e.g., user 104(1)) may be able to access the object data 112 but the object data 112 may generally be locked and inaccessible by other users 104. Accordingly, to facilitate a transfer of the object the object data 112 may be temporarily unlocked to enable access by a potential buyer (e.g., user 104(2)). The potential buyer may then examine the object data 112 to confirm the representations of the current owner regarding their ownership of the object and other relevant information regarding the object. Based at least partly on their examination of the object data 112, the buyer and seller may agree to the transfer of the object. The user application(s) 106 and/or other software module(s) may generate a transaction that updates the object data 112 to indicate the buyer as the new owner of the object, and to indicate the seller as a previous owner. The transaction may also update the object data 112 to include other information regarding the sale, such as the date and/or time of sale, the price or other terms, and so forth.

In some implementations, the distributed ledger system(s) 108 may execute smart contract(s) 114 that act as an AI intermediary between the users 104 (e.g., between the buyer, seller, and/or other parties to a transfer). In some implementations, the smart contract(s) 114 may automatically perform operations according to preprogrammed rules that govern the transfer of an object. For example, the smart contract(s) 114 may perform operations to combine multiple parcels of real estate (e.g., with multiple owners) into a single parcel that is owned by a single entity. The smart contract(s) 114 may also perform operations to divide a single parcel into multiple parcels to be owned by different entities. A smart contract 114 may also execute operations to handle rules associated with managing probate, such as the execution of a will, establishment of a trust, and/or the transfer of an object to heir(s) following the death of an owner. A smart contract 114 may execute operations to handle rules associated with other circumstances, such as marriage, divorce, birth of a child, death of an heir, and so forth. The smart contract 114 may perform operations according to other types of rules. For example, the current owner or previous owner may specify rule(s) governing future transfer of an object, such as a piece of real property. Such rule(s) may be enforced by the smart contract 114. In some instances, a piece of property may have multiple owners and/or the transfer of the property may require permission of user(s) 104 (e.g., interested parties) other than the owner(s). In such instances, the smart contract 114 may solicit the permission of the other owner(s) and/or other interested parties prior to allowing the transfer of the property.

Each of the user(s) 104 may have a digital security token that is useable to request access and/or updates to the object data 112 published by the distributed ledger(s) 110. In some implementations, the digital security token may be a cryptographic key (e.g., a private key) that is unique to a user 104. One or more private keys may be issued to one or more users 104 who enable their access to the distributed ledger 110. The private key(s) may each be associated with a public key corresponding to a particular distributed ledger 110, and each of the private keys may be employed with the public key to gain access to the distributed ledger 110. In some implementations, other credential(s) may also be used to control access to the distributed ledger(s) 110. For example, a user 104 may login to the user application 106 using a username, password, personal identification number (PIN), and/or other credentials. The private key of the user 104 may be stored on the user device 102, and the private key may be employed by the user application 106 to access the distributed ledger(s) 110 through a private-public key validation handshake.

In some instances, an object may be owned by multiple users 104, and each of the multiple users 104 may have a private key to access the distributed ledger 110 associated with the object. In some instances, all of the owners may be required to give their consent to enable a transfer of the object. In some instances, a majority of the owners may be required to give their consent. The handling of the transfer of an object with multiple owners may be managed by a smart contract 114 that is configured to implement the rules governing such a transfer, such as whether unanimous or majority ownership consent is required for the transfer. In some instances, a particular user 104 may be enabled to prevent a transfer (e.g., freeze a property). The smart contract 114 may also solicit that user's permission before allowing a transfer to proceed. In instances where the object has been placed into a trust, e.g., by a smart contract 114 executing a will, the trustee(s) may be issued keys or other digital security tokens to enable their access to the object data 112.

In some implementations, the smart contract(s) 114 may include logic to verify whether a title or other document published on the distributed ledger(s) 110 is correctly formatted (e.g., legally correct as a valid title or contract). The smart contract(s) 114 may also perform operations to detect possible fraudulent updates to the object data 112. For example, the smart contract(s) 114 may access sensor data such as global positioning system (GPS) coordinates of the user device 102 being employed to access the distributed ledger(s) 110, and compare that location to a previously detected or otherwise typical location of the user 104. In instances where a paper title is being scanned and uploaded to the distributed ledger 110 for an object, location metadata included in the image of the document may be compared to GPS information describing the location of the user device 102. Discrepancies in the location information from various sources may indicate possible fraud. In some implementations, the title may be added to the distributed ledger 110 with metadata that indicates a confidence level and/or likelihood that the title is fraudulent.

In some implementations, a federated identity model may be supported. The federated identity model may enable a user's identity to be verified based on the certification of an authority such as a bank, credit bureau, and so forth. In such implementations, a user 104 may request access to the distributed ledger 110 for an object, and the authority may confirm that the digital security token (e.g., key) supplied by the user 104 corresponds with the previously established identity of the user 104.

In some implementations, instead of or in addition to a federated identity model, other data may be employed to authenticate the user 104. Such other data may be unique to the user 104. For example, the user 104 may be authenticated based at least partly on biometric data such as fingerprints, retinal maps, brainwave patterns, and so forth. In such instances, the biometric data may be collected using sensor device(s) that are in proximity to the user 104 and that are known to be trusted (e.g., secured against spoofing or other compromise). Such sensor(s) may be at a particular location, such as at a bank, title agency, government office, and so forth, and may be trusted to collect biometric data that is accurate and not spoofed. In such instances, the user 104 may be required to travel to the particular location of the sensor(s) to perform operations to update the object data 112. In general, implementations support authentication of the user(s) 104 using any suitable number of authentication factors including but not limited to cryptographic keys or other digital security tokens, other credentials (e.g., username, password, PIN, challenge questions, etc.), biometric data, location information, and so forth.

In some implementations, the smart contract 114 may make decisions regarding which user(s) 104 are allowed to access and/or update the object data 112 published on the distributed ledger(s) 110. The smart contract(s) 114 may morph the methods employed to authenticate user(s) 104 depending on the particular circumstances and/or context of the access requests. For example, a smart contract 114 may determine that there is a likelihood that an access request for object transfer is fraudulent (e.g., that the user 104 is not who they purport to be). In such instances, the smart contract 114 may require biometric data to be collected regarding the user 104, to verify their identity. Moreover, the smart contract 114 may access other sensors that are in proximity to the user's purported location. Such sensors may capture images, audio data, air samples, hair samples (e.g., for DNA analysis), and/or other information to verify the user's identity and/or presence at a particular location. In some implementations, the smart contract(s) 114 may employ machine learning techniques to adjust (e.g., morph) the authentication methods that it employs to authenticate a user 104. The machine learning may be employed to determine a set of factor(s) to be employed to authenticate a user 104 given a particular set of circumstances, where the set of factor(s) minimizes the likelihood fraud under such circumstances.

Figure 2:
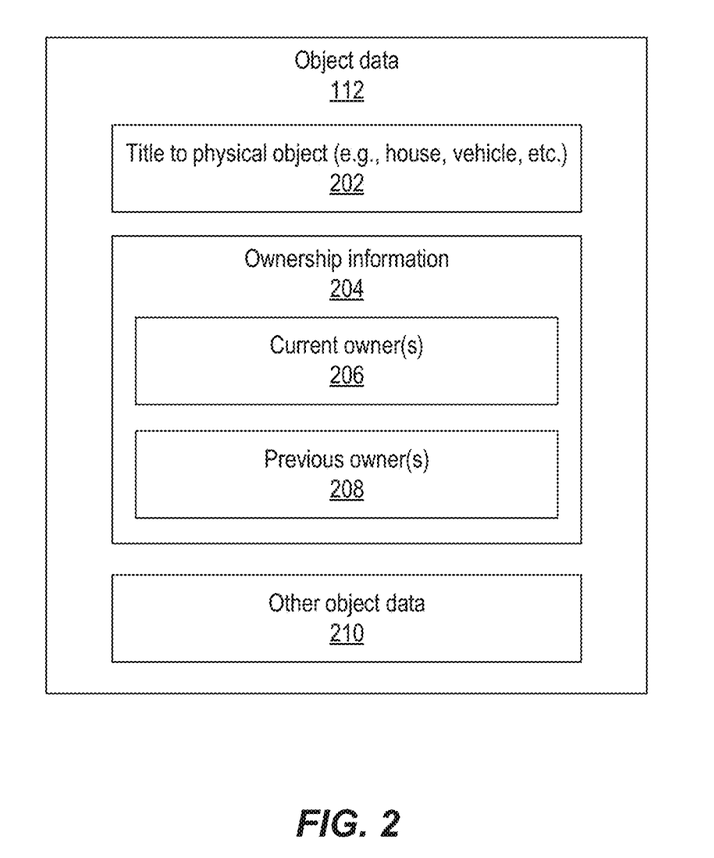
FIG. 2 depicts an example of object data that may be stored on a distributed ledger, according to implementations of the present disclosure.

FIG. 2 depicts an example of object data 112 that may be stored on a distributed ledger 110, according to implementations of the present disclosure. In some implementations, the object data 112 stored on the distributed ledger 110 may be encrypted and/or compressed. The object data 112 may include a title 202 to a physical object. The title 202 may include one or more of: an image of a physical title document (e.g., printed on paper); a digital digest of the information in the physical title; and/or digital version of at least a portion of the physical title. The object data 112 may also include ownership information 204 that identifies one or more individuals who are associated with the object. For example, the ownership information 204 may indicate the current owner(s) 206 of an object and/or the previous owner(s) 208 of the object. The ownership information 204 may indicate a period of time (e.g., start date and/or end date) during which each individual was associated with (e.g., owned) the object. The object data 112 may also include other object data 210. For example, the object data 112 may include a description of the object such as the size, acreage, dimensions, boundaries, location, and/or other information, in instances where the object is a parcel of real property. The other object data 210 may also describe the easement(s), rights of way, mineral rights, and/or other encumbrances that may constrain the use and/or transfer of the object. Other documents relevant to the object may also be published in the object data 112, such as birth certificates, death certificates, power of attorney documents, deeds of sale, and/or other digital representations of physical documents. In instances where a particular parcel is created by the combination of other parcels, or by the division of a larger parcel, the object data 112 for the particular parcel may include pointers that link to other distributed ledger(s) 110 corresponding to the parcel(s) that were combined or divided to generate the particular parcel.

Figure 3A:
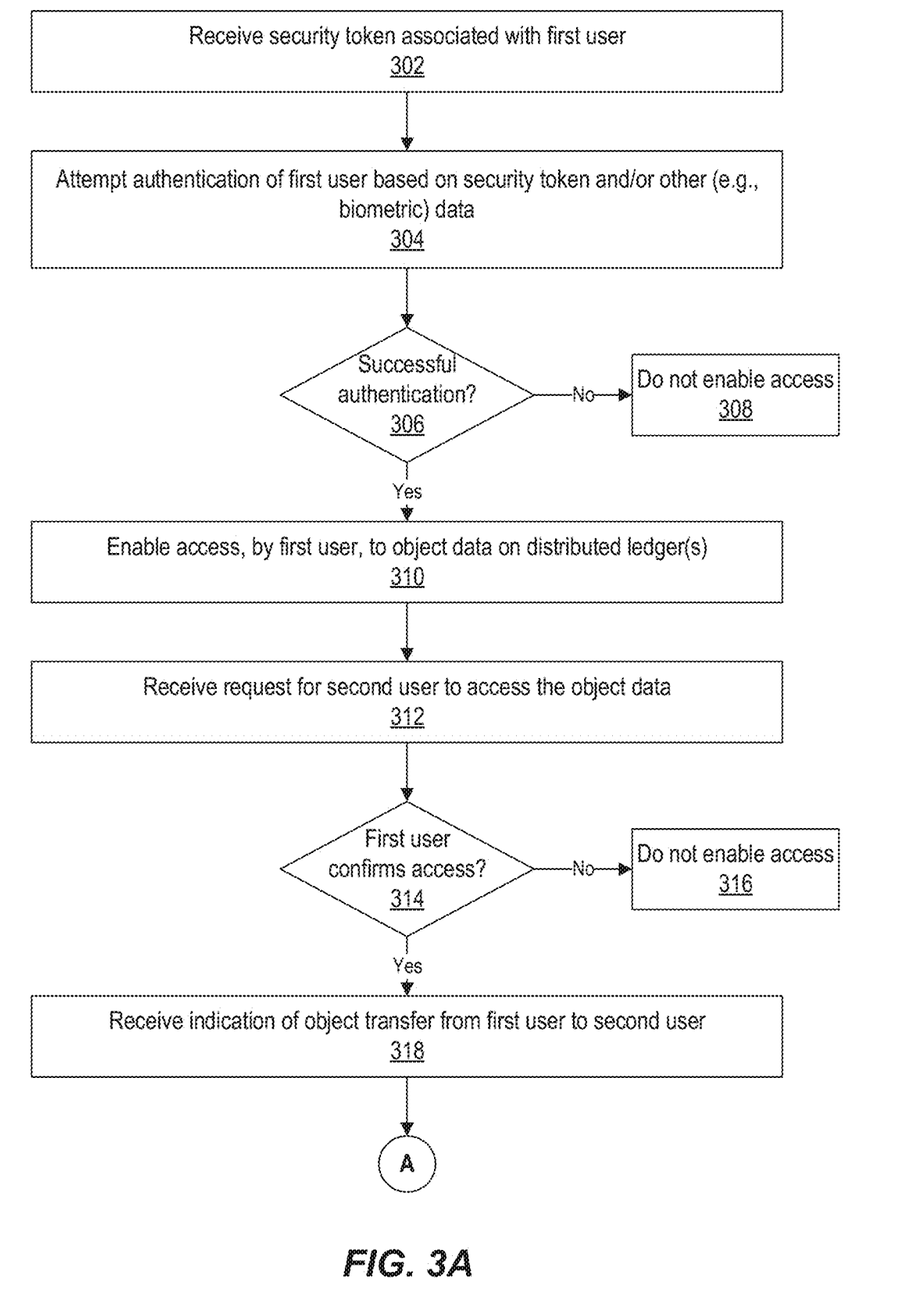
FIGS. 3A and 3B depict a flow diagram of an example process for managing objects using a distributed ledger, according to implementations of the present disclosure.
Figure 3B:
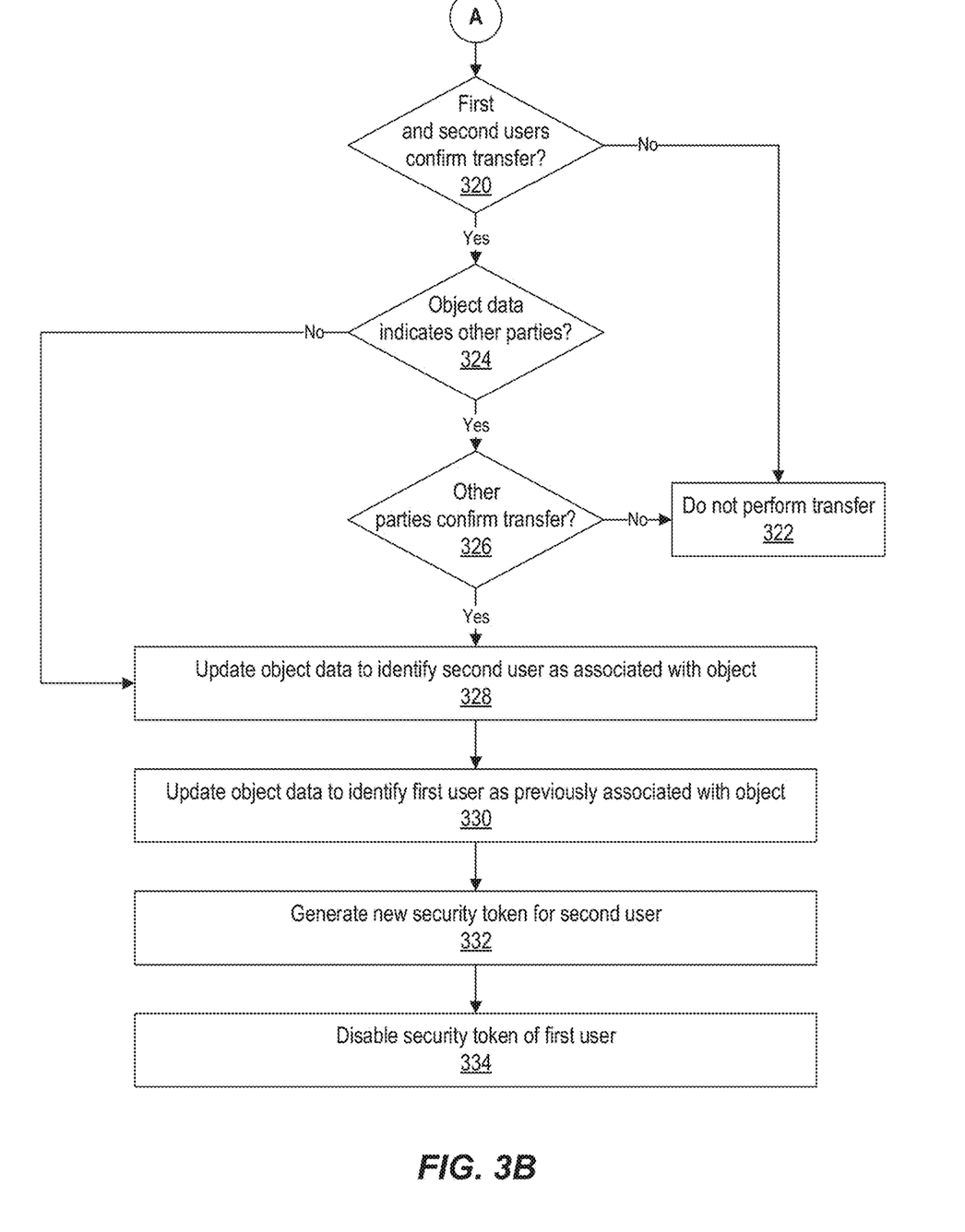

FIGS. 3A and 3B depict a flow diagram of an example process for managing objects using a distributed ledger, according to implementations of the present disclosure. Operations of the process may be performed by one or more of the user application(s) 106, the smart contract(s) 114, the distributed ledger(s) 110, and/or other software executing on the user device(s) 102, the distributed ledger system(s) 108, or elsewhere.

As shown in FIG. 3A, a request may be received from a user 104(1), e.g., to request access to object data 112 published on a distributed ledger 110 for an object. The request may be received (302) associated with the user 104(1). An attempt may be made to authenticate (304) the user 104(1) based on the digital security token. As described above, other data may also be collected and employed to authenticate the user 104(1), such as biometric data, location data, and so forth. Based on the data and/or digital security token, a determination is made (306) whether the authentication is successful. If not, the user 104(1) may not be enabled (308) to access the object data 112. If the user 104(1) is successfully authenticated, the user 104(1) may be enabled (310) to access the object data 112.

A request may be received (312) for a second user 104(2) to access the object data 112. In some implementations, the first user 104(1) may be asked (314) to confirm or deny the access of the second user 104(2). If the first user 104(1) denies access, the second user 104(2) may not be enabled (316) to access the object data 112. If the first user 104(1) confirmed access, the second user 104(2) may be enabled to access the object data 112. In some implementations, the second user 104(2) may also be authenticated based on a digital security token and/or other data as described above.

An indication may be received (318) of a transfer of ownership of the object from the first user 104(1) to the second user 104(2). The process continues as described with reference to FIG. 3B.

A determination may be made (320) whether the first user 104(1) and the second user 104(2) confirm the transfer of the object. If both users 104 do not so confirm, the transfer may not be performed (322). If the parties confirm the transfer, a determination may be made (324) whether the assent of other parties is required to perform the transfer. Such other parties may include other owner(s), entities with the ability to freeze a transfer, and/or other interested parties. In some instances, the other parties may be indicated by the object data 112. If other parties' content is needed, a determination may be made (326) whether the other parties confirm the transfer. If they do not confirm, the transfer may not be performed (322). If the other parties do confirm, or if it is determined (324) that no other parties' consent is required, the transfer may proceed.

To perform the transfer, the object data 112 may be updated (328) to identify the second user 104(2) as currently associated with the object (e.g., a current owner of the object). The object data 112 may also be updated (330) to identify the first user 104(1) as previously associated with the object (e.g., a previous owner of the object). In some implementations, a new digital security token (e.g., key) may be generated (332) and issued to the second user 104(2), to enable the second user 104(2) as owner to access the object data 112. In some implementations, the digital security token of the first user 104(1) may be disabled (334) to prevent their access to the object data 112, given that the first user 104(1) is no longer currently associated with the object.

In some implementations, the user application 106 may provide an interface that enables a user 104 to access the object data 112 to request transactions to update the object data 112, e.g., to facilitate a transfer. In some implementations, the interface may be a component of a wallet (e.g., cryptocurrency wallet) that executes on the user device 102. In response to a user 104 logging into the user application 106, the interface may present ID(s) for the various object(s) associated with the user 104, e.g., object(s) for which the user 104 is an owner and/or interested party. The user 104 may select (e.g., click on) a presented object ID and, in response, the user application 106 may employ the user's digital security token (e.g., key) to access the distributed ledger 110 that stores object data 112 for the selected object. The object data 112 may then be retrieved and presented in the interface. The interface may also present various controls or other user interface elements to enable the user 104 to initiate and/or approve transfer of the object, or otherwise update the object data 112.

In some implementations, a smart contract 114 may manage the transfer of the object in response to the requests of the users 104. In some instances, the smart contract 114 may impose a waiting period (e.g., hour(s), day(s), etc.) between the request for the transfer and the completion of the transfer. During the waiting period, the smart contract 114 may perform further operations to confirm the identities of the users 104, and/or otherwise provide safeguards that the transfer is not fraudulent. During the waiting period, smart contract 114 and/or a third party may arbitrate any disputes that arise between the parties to the transfer. In some implementations, the waiting period may be implemented for the transfer of a high-value object that has a value exceeding a predetermined threshold value.

As described herein, dynamic distributed ledger systems 108 may be employed to manage titles of titled objects such as real property, vehicles, and so forth. In some instances, a distributed ledger system 108 may be employed to facilitate the sale and management of shares in property, such as real property (e.g., a house or other building), a vehicle, and so forth. For example, implementations may enable an owner of a house to sell fractional shares in the property to other individuals. Using traditional methods for managing real estate investment, the sale of such shares may not be cost effective given the overhead cost of offering, selling, and tracking shares sold to multiple fractional owners, particularly for a property that is low in value compared to a large commercial real estate property. By managing such fractional sales of a property using a distributed ledger system, as described herein, implementations lower the overhead cost (e.g., the friction) of managing such investments, thus making fractional sales in a low-value real property (or other property) cost effective and viable. In such examples, the distributed ledger system may store a capitalization table that tracks the various fractional shares of the object that have been sold to the various individuals, shares that are available and/or offered for sale, the sale prices of the shares, the current value of the shares, the current level of capitalization for the object, and so forth.

Moreover, implementations may facilitate the shared ownership of a vehicle, real property, or other type of object by multiple individuals. For example, multiple individuals may have access to a distributed ledger that stores information regarding a vehicle that is jointly owned and/or operated by the individuals. The distributed ledger may store information describing the expenses for operating the vehicle, such as maintenance costs, fuel costs, spare parts, and so forth, as well as information describing revenues from operating the vehicle, such as revenues received through using the vehicle in a ridesharing or taxi service.

In some examples, the distributed ledger system 108 includes distributed ledger(s) 110 that are one or more blockchains, which can include a transaction database shared by all nodes participating in a system based on a predefined protocol (e.g., the BitCoin™ protocol). In some examples, the blockchain is a publicly available blockchain (e.g., available to any and every entity/user on a network such as the internet). In some examples, the blockchain is a private blockchain (e.g., available to one or more entities/users that are credentialed users on a network). In some examples, the blockchain can be a hybrid blockchain (e.g., public and private).

In accordance with implementations of the present disclosure, the distributed ledger system provides immutable proof of title ownership, liens, and/or title transfer for titled objects. Example titled objects can include cars, boats, motorcycles, real estate, intellectual property, and the like. In general, a titled object can include any object that is transferable from one party to another. A titled object may be an object that has a physical presence as a tangible object or set of objects.

For example, the distributed ledger system can provide an immutable interaction record of entities based on a respective interaction between entities that results in a merger or dissolution of rights and/or liabilities. Example interactions can include, but are not limited to, a merger (e.g., marriage of two people, corporate merger), conclusion (e.g., divorce of two people, death of a person in a marriage, sale/spin-off of a portion of a company), contracts (e.g., agreements between entities), and so forth.

In some examples, each interaction event is treated as a transaction that is added to the distributed ledger system. For example, each transaction is added to a block of a blockchain. In some examples, each block is based on a plurality of transactions. In some examples, the plurality of transactions includes interaction events of multiple sets of entities.

In some implementations, each interaction event includes one or more transaction details. For example, example transaction details for a marriage can include date, time, location, jurisdiction (e.g., State), officiant, and the like. As another example, example transaction details for a corporate merger can include corporate entities being merged, name of new corporation, State of Incorporation, type of corporation (e.g., PC, LLC, C-Corp., S-Corp.), corporate officers, corporate address, agent (if any), a copy (e.g., digital image) of the certificate of incorporation, a copy (e.g., digital image) of application, and the like.

In accordance with implementations of the present disclosure, each interaction event can be encrypted before being stored to the distributed ledger system. In some examples, interaction events can be retrieved and decrypted by credentialed users. For example, interaction events of persons can be recorded in a respective interaction event record on the distributed ledger system, and can be encrypted using a private-public key encryption scheme. For example, a user can grant another user access to interaction events (e.g., all interaction events, a sub-set of interaction events) recorded on the distributed ledger system, the user can retrieve the interaction events that they have been granted access to (e.g., using one or more predefined credentials), and can decrypt the retrieved interaction events based on the implemented encryption scheme. Because the interaction events, and underlying transaction detail, are provided from the distributed ledger system, the accuracy of the interaction event (and transaction detail(s)) can be considered accurate/trustworthy.

An example use case includes using the distributed ledger system to record interaction events of a person between the person and one or more other people and/or companies. In some examples, marriage/divorce events can be recorded in the distributed ledger system for the person. In one example, the person can provide access to the marriage/divorce events to a third-party. For example, a mediator that is to mediate a divorce between two people can access the marriage/divorce events to mediate the divorce. In some examples, the mediation/divorce itself can be added as an interaction event to the distributed ledger system.

Another example use case includes using the distributed ledger system to record merger/dissolution events of enterprises (e.g., corporations). In some examples, merger/dissolution events can be recorded in the distributed ledger system for an enterprise. In one example, the enterprise can provide access to the merger/dissolution events to a third-party. For example, an auditor can access the merger/dissolution events to prepare/develop an audit of the enterprise.

To provide further context for the present disclosure, a high-level discussion of blockchain technology is provided. In general, a blockchain is a public ledger of all transactions that have ever been executed in one or more contexts (e.g., negotiable instrument transactions, digital currency transactions, etc.). A blockchain constantly grows as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all users (e.g., financial institutions) need to know all previous transactions (e.g., deposits, withdrawals, etc.) to validate a requested transaction, all users must agree on which transactions have actually occurred, and in which order. For example, if two users observe different transaction histories, they will be unable to come to the same conclusion regarding the validity of a transaction. The blockchain enables all users to come to an agreement as to transactions that have already occurred, and in which order. In short and as described in further detail below, a ledger of transactions is agreed to, based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as described above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger system can include one or more sidechains. A sidechain can be described as a blockchain that validates data from other blockchains. In some examples, a sidechain enables ledger objects (e.g., a digital currency) to be transferred between multiple blockchains.

Figure 4:
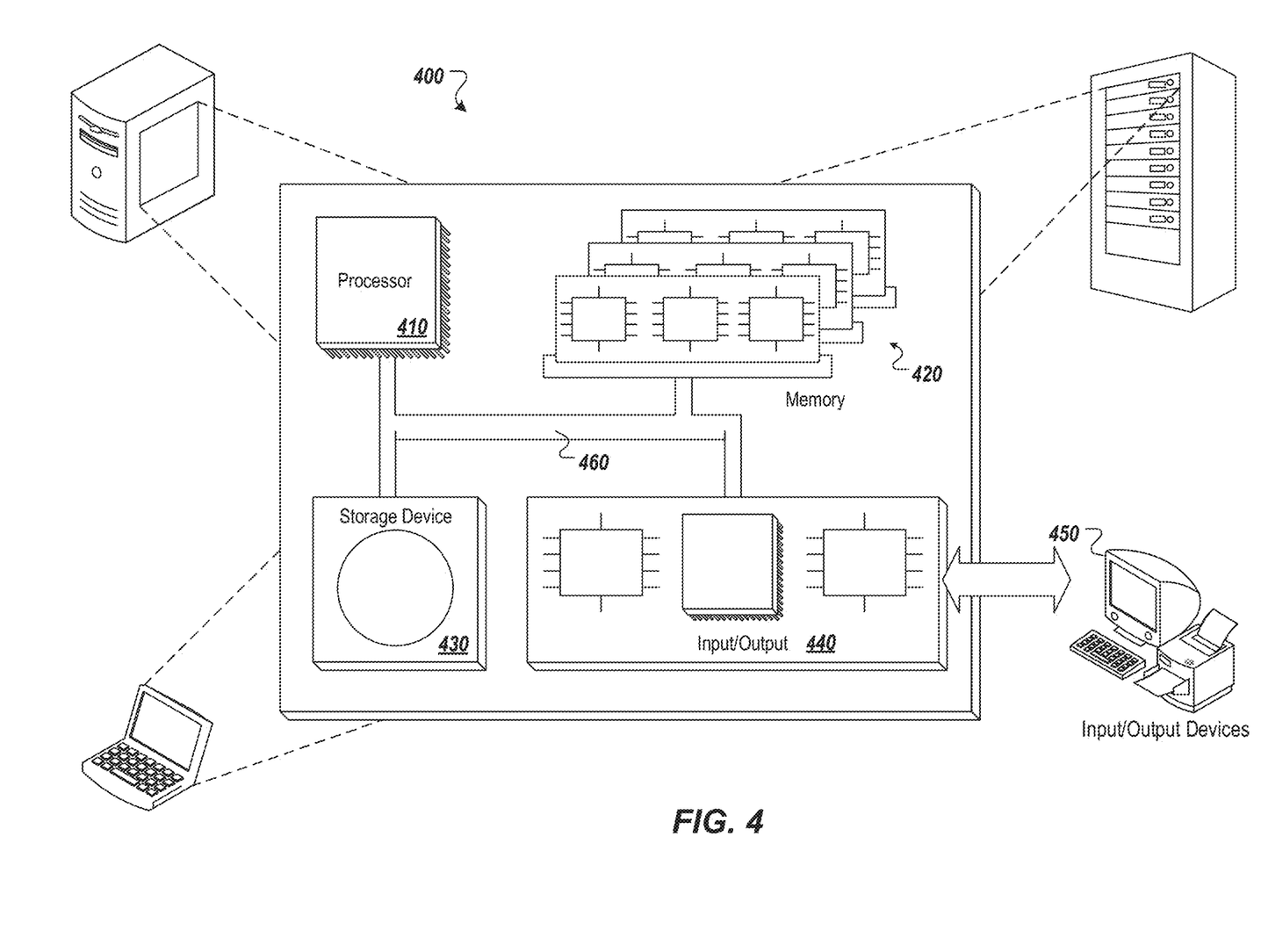
FIG. 4 depicts an example computing system, according to implementations of the present disclosure.

FIG. 4 depicts an example computing system, according to implementations of the present disclosure. The system 400 may be used for one or more of the operations described with respect to the various implementations discussed herein. For example, the system 400 may be included, at least in part, in one or more of user device(s) 102, the distributed ledger system(s) 108, or other computing device(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any suitable number of volatile memory units and/or non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, and/or between the system 400 and other network-connected computing systems. The network interface(s) may include one or more network interface controllers (NICs) or other types of transceiver devices configured to send and receive communications over one or more networks using any suitable network protocol.

Computing devices of the system 400 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a tangible, non-transitory machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display)

monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:

receiving, by the at least one processor, a digital security token associated with a first user from a computing device associated with the first user;

receiving, by the at least one processor, biometric data from at least one biometric sensor after the first user is within a threshold distance from a location, wherein the at least one biometric sensor is disposed at the location and is separate from the computing device, and wherein the biometric sensor is communicatively coupled to the at least one processor;

receiving, by the at least one processor, verification data from an additional sensor configured to verify that the first user is at the location, wherein the additional sensor is separate from the computing device and the biometric sensor, wherein the verification data comprises audio data, image data, air quality data, or any combination thereof, and wherein the additional sensor is communicatively coupled to the at least one processor;

authenticating, by the at least one processor, the first user based at least partly on the digital security token, the biometric data, and the verification data;

accessing, by the at least one processor, object data stored on a distributed ledger, the object data comprises a title representative of the first user having ownership of a physical object in response to the first user being authenticated;

receiving, by the at least one processor, a request comprising an indication of the ownership of the physical object being transferred to a second user;

receiving, by the at least one processor, a confirmation, from the first user, that the ownership of the physical object is to transfer to the second user;

based on the confirmation received from the first user, updating, by the at least one processor, the title of the object data stored on the distributed ledger indicating the transfer of ownership of the physical object to the second user;

in response to the title of the object data being updated indicating that ownership of the physical object is transferred to the second user, generating, by the at least one processor, a new digital security token providing the second user access to the object data;

in response to the new digital security token being generated, by the at least one processor, disassociating, by the at least one processor, the digital security token associated with the first user from the object data stored on the distributed ledger; and in response to receiving the digital security token associated with the first user, by the at least one processor, denying the first user access to the object data after the new digital security token is generated.

2. The method of claim 1, wherein:

the object data includes a digital version of a field of the title comprising an indication of an ownership of the physical object; and updating the object data includes modifying the digital version of the title to indicate the second user as a current owner of the physical object.

3. The method of claim 1, wherein the digital security token includes a private cryptographic key associated with the first user, the private cryptographic key providing access to the distributed ledger.

4. The method of claim 1, further comprising:

updating, by the at least one processor, the object data with an indication of the first user being previously associated with the physical object.

5. The method of claim 1, wherein:
the object data describes a third user as an interested party associated with the physical object; and
updating the object data is further based on permission received from the third user.

6. The method of claim 1, wherein the distributed ledger is a blockchain.

7. A system, comprising:
at least one processor;
at least one biometric sensor is communicatively coupled to the at least one processor; and
a memory communicatively coupled to the at least one processor, the memory storing instructions which, when executed by the at least one processor, cause the at least one processor to perform operations comprising:
receiving a digital security token associated with the first user from a computing device associated with the first user;
receiving the biometric data from the at least one biometric sensor after the first user is within a threshold distance from a location, wherein the at least one biometric sensor is disposed at the location and is separate from the computing device;
receiving verification data from an additional sensor configured to verify that the first user is at the location, wherein the additional sensor is separate from the computing device and the biometric sensor, wherein the verification data comprises audio data, image data, air quality data, or any combination thereof, and wherein the additional sensor is communicatively coupled to the at least one processor;
authenticating the first user based at least partly on the digital security token, the biometric data, and the verification data;
accessing object data stored on a distributed ledger, the object data comprises a title representative of the first user having ownership of a physical object in response to the first user being authenticated;
receiving a request comprising an indication of the ownership of the physical object being transferred to a second user;
receiving a confirmation, from the first user, that the ownership of the physical object is to transfer to the second user;
based on the confirmation received from the first user, updating the title of the object data stored on the distributed ledger indicating transfer of ownership of the physical object to the second user;
in response to the title of the object data being updated indicating that the ownership of the physical object is transferred to the second user, generating a new digital security token providing the second user to access to the object data;
in response to the new digital security token being generated, disassociating the digital security token associated with the first user from the object data stored on the distributed ledger; and
in response to receiving the digital security token associated with the first user, denying the first user access to the object data after the new digital security token is generated.

8. The system of claim 7, wherein:
the object data includes a digital version of a field of the title comprising an indication of ownership of the physical object; and
updating the object data includes modifying the digital version of the title to indicate the second user as a current owner of the physical object.

9. The system of claim 7, wherein the digital security token includes a private cryptographic key associated with the first user, the private cryptographic key providing access to the distributed ledger.

10. The system of claim 7, the operations further comprising:
updating the object data with an indication of the first user being previously associated with the physical object.

11. The system of claim 7, wherein:
the object data describes a third user as an interested party associated with the physical object; and
the memory storing instructions which, when executed by the at least one processor, cause the at least one processor to perform the operations comprises updating the object data based on additional permission received from the third user.

12. The system of claim 7, wherein the distributed ledger is a blockchain.

13. One or more tangible, non-transitory, computer-readable media storing instructions which, when executed by at least one processor, cause the at least one processor to perform operations comprising:
receiving a digital security token associated with a first user from a computing device associated with the first user;
receiving biometric data from at least one biometric sensor after the first user is within a threshold distance from a location and is separate from the computing device, and wherein the at least one biometric sensor is communicatively coupled to the at least one processor;
receiving verification data from an additional sensor configured to verify that the first user is at the location, wherein the additional sensor is separate from the computing device and the biometric sensor, wherein the verification data comprises audio data, image data, air quality data, or any combination thereof, and wherein the additional sensor is communicatively coupled to the at least one processor;
authenticating the first user based at least partly on the digital security token the biometric data, and the verification data;
accessing object data stored on a distributed ledger, the object data comprises a title representative of the first user having ownership of a physical object in response to the first user being authenticated;
receiving a request comprising an indication of the ownership of the physical object being transferred to a second user;
receiving a confirmation, from the first user, that the ownership of the physical object is to transfer to the second user;
based on the confirmation received from the first user, updating the title of the object data stored on the distributed ledger indicating transfer of ownership of the physical object to the second user;
in response to the title of the object data being updated indicating that the ownership of the physical object is transferred to the second user, generating a new digital security token providing the second user access to the object data;
in response to the new digital security token being generated, disassociating the digital security token associated with the first user from the object data stored on the distributed ledger; and in response to receiving the digital security token associated with the first user, denying the first user access to the object data after the new digital security token is generated.

14. The one or more tangible, non-transitory, computer-readable media of claim 13, wherein:

the object data includes a digital version of a field of the title comprising an indication ownership of the physical object; and the instructions which, when executed by at least one processor, cause the at least one processor to perform the operations comprises updating the object data includes modifying the digital version of the title to indicate the second user as a current owner of the physical object.

15. The one or more tangible, non-transitory, computer-readable media of claim 13, the operations further comprising:

updating the object data with an indication of the first user being previously associated with the physical object.

* * * * *